Patented Sept. 15, 1931

1,822,979

UNITED STATES PATENT OFFICE

FERDINAND MÜNZ, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

ESTERIFIED FATTY ACID DERIVATIVES AND PROCESS OF PREPARING SAME

No Drawing. Application filed January 27, 1930, Serial No. 423,883, and in Germany February 7, 1929.

My present invention relates to new fatty acid derivatives and to a process of preparing same, by acting in any sequence with a sulfonating agent and a lower monohydroxy, fatty alcohol on unsaturated natural fats and oils, particularly those containing glyceride esters of higher fatty acids containing at least 18 carbon atoms hereinafter referred to collectively for sake of brevity as unsaturated fats.

Either the unsaturated fat is at first treated in the usual manner with a sulfonating agent and then the lower monohydroxy alcohol is allowed to act, or vice versa at first the interaction between the fat and the alcohol is effected and then the reaction mass is treated with a usual sulfonating agent. It is assumed that the reaction comprises besides the usual sulfonation a whole or partial conversion of the glyceride ester group into the lower alcoholic ester group.

The reaction products, consisting, therefore, apparently mainly of the sulfuric acid of a hydroxy fatty acid containing 18 carbon atoms or more and esterified in the carboxylic group with the lower monohydroxy fatty alcohol (in many cases in admixture with more or less quantities of the sulfuric acid ester of the free fatty acid or its glyceride), represent new compounds which are slightly to brownish colored viscous oils, soluble in water, of Turkey red oil like properties, but being distinguished by a remarkable wetting power.

In order to further illustrate my invention the following examples are given, the parts being by weight and all temperatures in centigrade degrees, but it is however to be understood that my invention is not limited to the particular products nor reacting conditions mentioned therein:—

*Example 1*

50 parts of hydrochloric acid gas are dissolved in about 1000 parts of butylic alcohol and 1000 parts of castor oil are added. The mixture is boiled for some hours in an apparatus provided with a reflux condenser and the excess of butylic alcohol is distilled off. Then to the reaction mixture at about 15-20° 1000 parts of sulfuric acid of 66° Bé. are added. The mass is stirred until it becomes soluble in water, then it is poured on ice, neutralized with a caustic soda solution and the sodium salt of the new esterified compound thus formed is isolated in the usual manner. It represents a slightly colored viscous oil, soluble in water of a Turkey red oil like aspect, distinguished by a remarkable wetting power.

*Example 2*

116 parts of chlorosulfonic acid are introduced at about 10-15° in about 500 parts of ether and then at the same temperature 310 parts of castor oil are added. While forming a glyceride-sulfuric acid ester, the product becomes soluble in water, and then the ethereal solution is added to 240 parts of isopropyl alcohol. The reaction mixture is kept for about 6-8 hours at room temperature and then the reaction mass is poured on ice and neutralized. Advantageously the new product thus obtained, consisting substantially of the sulfuric acid ester of hydroxystearic acid esterified in the carboxylic acid with isopropyl alcohol (probably in admixture with some quantities of the corresponding glyceride or free acid compound), is isolated by the addition of common salt, and the ether is removed, for instance, by slightly warming.

The reaction product represents a brownish oil of a Turkey red oil like aspect, having a good wetting power also in a neutral or alkaline bath.

In the same manner, for instance, olive oil or linseed oil may be subjected to the process described in the examples.

I claim:—

1. A process which comprises acting with a sulfonating agent and a lower monohydroxy fatty alcohol on an unsaturated fat containing 18 carbon atoms or more in its molecule.

2. A process which comprises sulfonating an unsaturated fat containing 18 carbon atoms or more in its molecule in the usual manner and acting on the reaction mixture with a lower monohydroxy fatty alcohol.

3. As new compounds derivatives of a hydroxy fatty acid containing 18 carbon atoms or more in its molecule, being sulfuric acid esters of such higher fatty acids mainly esterified in the carboxylic acid group with a monohydroxy lower fatty alcohol, which products are obtainable by acting with a sulfonating agent and a lower monohydroxy fatty alcohol on an unsaturated fat containing 18 carbon atoms or more in its molecule.

4. As new compounds derivatives of a hydroxy fatty acid containing 18 carbon atoms in its molecule, being sulfuric acid esters of such higher fatty acids mainly esterified in the carboxylic acid group with a monohydroxy lower fatty alcohol, which products are obtainable by acting with a sulfonating agent and a lower monohydroxy fatty alcohol on an unsaturated fat containing 18 carbon atoms in its molecule.

In testimony whereof, I affix my signature.

FERDINAND MÜNZ.

DISCLAIMER 1,822,979.—*Ferdinand Münz*, Frankfort-on-the-Main-Fechenheim, Germany. ESTERIFIED FATTY ACID DERIVATIVES AND PROCESS OF PREPARING SAME. Patent dated September 15, 1931. Disclaimer filed March 7, 1933, by the assignee, *General Aniline Works, Inc.*

Hereby enters this disclaimer to said claims 3 and 4.

[*Official Gazette April 11, 1933.*]